US012659276B2

(12) United States Patent
K N et al.

(10) Patent No.: US 12,659,276 B2
(45) Date of Patent: Jun. 16, 2026

(54) LOAD BALANCING NETWORK TRAFFIC PROCESSING FOR WORKLOADS AMONG PROCESSING CORES

(71) Applicant: Juniper Networks, Inc., Sunnyvale, CA (US)

(72) Inventors: Kiran K N, Bangalore (IN); Shailender Sharma, Bangalore (IN); Rakesh Kumar Reddy Varimalla, Bengaluru (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 239 days.

(21) Appl. No.: 18/176,245

(22) Filed: Feb. 28, 2023

(65) Prior Publication Data

US 2024/0291761 A1     Aug. 29, 2024

(51) Int. Cl.
*H04L 47/125*     (2022.01)
*G06F 9/50*     (2006.01)
(Continued)

(52) U.S. Cl.
CPC .......... *H04L 47/125* (2013.01); *G06F 9/5088* (2013.01); *H04L 43/067* (2013.01);
(Continued)

(58) Field of Classification Search
CPC . H04L 47/125; H04L 43/067; H04L 43/0882; H04L 45/586; H04L 67/1012;
(Continued)

(56) References Cited

U.S. PATENT DOCUMENTS 9,571,394 B1   2/2017   Sivaramakrishnan et al.
10,142,226 B1 *   11/2018   Wu ........................ H04L 45/586
(Continued)

FOREIGN PATENT DOCUMENTS

CN   115357339 A   11/2022
EP   2466460 A1   6/2012
(Continued)

OTHER PUBLICATIONS

Extended Search Report from counterpart European Application No. 23178479.4 dated Oct. 19, 2023, 7 pp.
(Continued)

*Primary Examiner* — Emmanuel L Moise
*Assistant Examiner* — Robert A Shaw
(74) *Attorney, Agent, or Firm* — Shumaker & Sieffert P.A.

(57) ABSTRACT

In general, techniques are described for dynamically load balancing among processing cores that a virtual router of a computing device uses to process network traffic associated with different workloads executing on the computing device. In some examples, a first computing device may assign, based on one or more metrics that indicate processing cores utilization or that indicate network traffic processing requirements for a workload that is to execute on a second computing device, network traffic processing for the workload to a first processing core of a plurality of processing cores of the second computing device. A virtual router, executing on the first processing core based on the assigning, may process network traffic for the workload.

20 Claims, 5 Drawing Sheets

(51) Int. Cl.

| | |
|---|---|
| *H04L 41/40* | (2022.01) |
| *H04L 43/067* | (2022.01) |
| *H04L 43/0817* | (2022.01) |
| *H04L 43/0882* | (2022.01) |
| *H04L 43/16* | (2022.01) |
| *H04L 45/586* | (2022.01) |
| *H04L 67/1008* | (2022.01) |
| *H04L 67/1012* | (2022.01) |

(52) U.S. Cl.
CPC ........ *H04L 43/0882* (2013.01); *H04L 45/586* (2013.01); *H04L 67/1008* (2013.01); *H04L 67/1012* (2013.01); *H04L 41/40* (2022.05); *H04L 43/0817* (2013.01); *H04L 43/16* (2013.01)

(58) Field of Classification Search
CPC ..... H04L 41/40; H04L 43/0817; H04L 43/16; H04L 67/1008; G06F 9/5088
See application file for complete search history.

(56) References Cited

U.S. PATENT DOCUMENTS

| | | | |
|---|---|---|---|
| 2006/0090161 A1* | 4/2006 | Bodas ................... | G06F 9/5044 718/100 |
| 2007/0121579 A1* | 5/2007 | Matthews ............. | H04L 45/586 370/351 |
| 2007/0282572 A1* | 12/2007 | Larus ................... | G06F 9/5066 703/2 |
| 2008/0141264 A1 | 6/2008 | Johnson et al. | |
| 2010/0325257 A1* | 12/2010 | Goel ...................... | H04L 61/103 709/244 |
| 2011/0153724 A1* | 6/2011 | Raja .................... | H04L 67/1001 709/223 |
| 2012/0233477 A1* | 9/2012 | Wu ....................... | G06F 9/5027 712/E9.035 |
| 2013/0297802 A1* | 11/2013 | Laribi ................. | H04L 12/6418 709/226 |
| 2015/0067171 A1* | 3/2015 | Yum ..................... | H04L 67/562 709/226 |
| 2015/0296002 A1* | 10/2015 | Pell ........................ | G06F 9/505 709/226 |
| 2017/0052827 A1* | 2/2017 | Shieh ..................... | G06F 9/5083 |
| 2017/0090987 A1* | 3/2017 | Hearn ................... | G06F 13/362 |
| 2017/0177396 A1* | 6/2017 | Palermo ............. | G06F 9/45558 |
| 2017/0230733 A1* | 8/2017 | Rana ........................ | H04Q 9/00 |
| 2017/0286142 A1* | 10/2017 | Palermo ............. | G06F 9/45558 |
| 2017/0318082 A1* | 11/2017 | Thakur .................. | G06F 9/505 |
| 2018/0109606 A1* | 4/2018 | Alpert ................. | H04L 67/1025 |
| 2018/0157515 A1* | 6/2018 | Malloy ................. | G06F 9/5033 |
| 2018/0241802 A1* | 8/2018 | Bernat ................ | H04L 43/0894 |
| 2018/0285166 A1* | 10/2018 | Roy ....................... | G06F 9/5077 |
| 2018/0336067 A1* | 11/2018 | Lee ......................... | H04L 47/34 |
| 2018/0357086 A1* | 12/2018 | Kinsella ................. | G06F 9/5077 |
| 2019/0042298 A1* | 2/2019 | Sunku ................. | G06F 9/5027 |
| 2019/0042326 A1* | 2/2019 | Chilikin ............. | G06F 9/45558 |
| 2019/0045000 A1* | 2/2019 | Hiremath .............. | H04L 49/501 |
| 2019/0097946 A1* | 3/2019 | Lokman .................. | G06F 9/455 |
| 2019/0220319 A1* | 7/2019 | Parees ................... | G06F 9/5027 |
| 2020/0059420 A1* | 2/2020 | Abraham ................ | H04L 41/12 |
| 2020/0106744 A1* | 4/2020 | Miriyala ............. | H04L 41/0895 |
| 2020/0125389 A1* | 4/2020 | Palermo .............. | H04W 28/084 |
| 2020/0341832 A1* | 10/2020 | Poghosyan ........ | G06F 11/0793 |
| 2020/0348973 A1* | 11/2020 | Kutch .................... | H04L 43/08 |
| 2021/0075730 A1* | 3/2021 | Palermo ............. | H04L 47/6275 |
| 2021/0144198 A1* | 5/2021 | Yu ...................... | H04W 28/0967 |
| 2021/0328933 A1* | 10/2021 | Thyagaturu ............ | H04L 41/40 |
| 2022/0038376 A1* | 2/2022 | Mowat ................ | H04L 47/2441 |
| 2022/0114033 A1* | 4/2022 | Arvinte ................ | G06F 18/217 |
| 2022/0278927 A1 | 9/2022 | Mariappan et al. | |
| 2022/0286399 A1* | 9/2022 | McDonnell ......... | H04L 47/6275 |
| 2022/0291970 A1* | 9/2022 | Kumar .................. | G06F 9/5077 |
| 2022/0321470 A1* | 10/2022 | Qian ....................... | H04L 45/16 |
| 2022/0321471 A1* | 10/2022 | Deb ...................... | H04L 69/326 |
| 2022/0329539 A1 | 10/2022 | Kim et al. | |
| 2023/0195499 A1* | 6/2023 | Connor .............. | G06F 11/3442 709/226 |
| 2023/0205606 A1* | 6/2023 | Palermo ............... | G06F 9/5072 718/104 |
| 2023/0217253 A1* | 7/2023 | Palermo ............. | H04W 12/125 726/23 |
| 2023/0409362 A1* | 12/2023 | Shevade ............. | H04L 41/0895 |
| 2024/0022477 A1* | 1/2024 | Sharma ............... | H04L 41/0806 |
| 2024/0054020 A1 | 2/2024 | Xue et al. | |
| 2024/0256283 A1* | 8/2024 | Fryman ................. | G06F 13/124 |

FOREIGN PATENT DOCUMENTS

| | | | | | |
|---|---|---|---|---|---|
| EP | | 3541028 A1 | * | 9/2019 | ........ H04L 12/4641 |
| IN | 202244015007 A | | * | 12/2022 | ........ H04L 43/0876 |
| WO | WO-9918751 A1 | | * | 4/1999 | ........ H04Q 11/0478 |
| WO | WO-0124446 A2 | | * | 4/2001 | ............ H04L 47/10 |
| WO | WO-2007143122 A1 | | * | 12/2007 | .......... G06F 9/5066 |
| WO | WO-2016198112 A1 | | * | 12/2016 | .......... G06F 9/5066 |
| WO | WO-2017052910 A1 | | * | 3/2017 | .......... G06F 9/5027 |
| WO | WO-2020005276 A1 | | * | 1/2020 | .......... G06F 9/4881 |
| WO | WO-2021188183 A1 | | * | 9/2021 | .......... H04L 45/123 |
| WO | WO-2022212146 A1 | | * | 10/2022 | ............ H04L 45/04 |

OTHER PUBLICATIONS

Mao et al., "Resource Management with Deep Reinforcement Learning", 15th ACM workshop on hot topics in networks, Nov. 9, 2016, pp. 50-56, URL: https://people.csail.mit.edu/alizadeh/papers/deeprm-hotnets 16.pdf.

U.S. Appl. No. 18/394,526, filed Dec. 22, 2023, naming inventors Kn et al.

Communication pursuant to Article 94(3) EPC from counterpart European Application No. 23178479.4 dated Sep. 8, 2025, 6 pp.

Response to Extended Search Report dated Oct. 19, 2023, from counterpart European Application No. 23178479.4 filed Mar. 4, 2025, 19 pp.

Response to Extended Search Report dated Sep. 8, 2025, from counterpart European Application No. 23178479.4 filed Jan. 8, 2026, 18 pp.

* cited by examiner

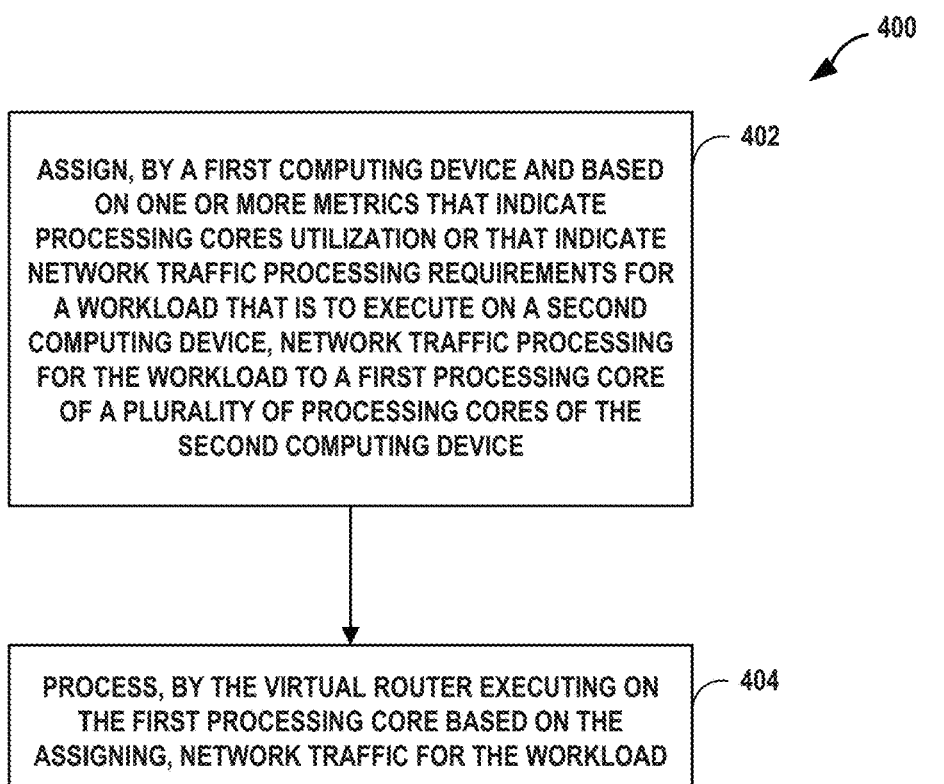

400

402

ASSIGN, BY A FIRST COMPUTING DEVICE AND BASED ON ONE OR MORE METRICS THAT INDICATE PROCESSING CORES UTILIZATION OR THAT INDICATE NETWORK TRAFFIC PROCESSING REQUIREMENTS FOR A WORKLOAD THAT IS TO EXECUTE ON A SECOND COMPUTING DEVICE, NETWORK TRAFFIC PROCESSING FOR THE WORKLOAD TO A FIRST PROCESSING CORE OF A PLURALITY OF PROCESSING CORES OF THE SECOND COMPUTING DEVICE

404

PROCESS, BY THE VIRTUAL ROUTER EXECUTING ON THE FIRST PROCESSING CORE BASED ON THE ASSIGNING, NETWORK TRAFFIC FOR THE WORKLOAD

FIG. 4

LOAD BALANCING NETWORK TRAFFIC PROCESSING FOR WORKLOADS AMONG PROCESSING CORES

TECHNICAL FIELD

The disclosure relates to a virtualized computing infra- structure and, more specifically, to load balancing network traffic processing by a virtual router.

BACKGROUND

Virtualized data centers are becoming a core foundation of the modern information technology (IT) infrastructure. In particular, modern data centers have extensively utilized virtualized environments in which virtual hosts, also referred to herein as workloads, such as virtual machines or pods of containers, are deployed and executed on an under- lying compute platform of physical computing devices. A virtual router creates virtual overlay networks ("virtual networks") on top of a physical underlay network and processes and forwards data traffic between virtual hosts within a virtual overlay network.

SUMMARY

In general, techniques are described for dynamically load balancing among processing cores that a virtual router of a computing device uses to process network traffic associated with different workloads executing on the computing device. The virtual router is responsible for processing network traffic sourced by and destined to the workloads; such processing can include routing and forwarding, encapsula- tion and decapsulation for overlay tunnel network traffic, and other network traffic processing. As described in detail herein, the virtual router assigns (or is instructed to assign) the task of network traffic processing for a given workload to a particular processing core of the computing device based on metrics indicative of network traffic processing requirements for the workload. The virtual router processes the network traffic for the workload using the assigned processing core. In some examples, the virtual router may rebalance assignments due to new (or deleted) workloads, changes in amounts of network processing required for respective workloads, or other factor(s).

The techniques may provide one or more technical advan- tages that realize one or more practical applications. For example, by assigning network traffic processing for work- loads in a manner informed by metrics, the virtual router can more efficiently and effectively load balance workloads' network processing among the processing cores of the computing device versus a static, round-robin assignment scheme. Dynamic re-balancing of the assignments may reduce processing core starvation (network processing load too low) or overloading (network processing load too high), improve overall utilization, and/or reduce network process- ing bottlenecks and attendant latencies that may occur due oversubscribing a processing core.

In one example, a computing system comprises process- ing circuitry having access to a storage device. The process- ing circuitry is configured to assign, based on one or more metrics that indicate processing cores utilization or that indicate network traffic processing requirements for a work- load that is to execute on a computing device, network traffic processing for the workload to a first processing core of a plurality of processing cores of the computing device. The processing circuitry is also configured to instruct, based on the assignment, a virtual router of the computing device to execute on the first processing core to process the network traffic for the workload.

In another example, a computing device comprises pro- cessing circuitry having access to a storage device. The processing circuitry is configured to obtain assignment data, wherein the assignment data is based on one or more metrics that indicate processing cores utilization or that indicate network traffic processing requirements for a workload that is to execute on the computing device, and wherein the assignment data maps the workload to a first processing core of the plurality of processing cores of the computing device. The processing circuitry is also configured to process, by a virtual router executing on the first processing core based on the mapping, network traffic for the workload.

In one example, a method comprises assigning, by a first computing device, based on one or more metrics that indi- cate processing cores utilization or that indicate network traffic processing requirements for a workload that is to execute on a second computing device, network traffic processing for the workload to a first processing core of a plurality of processing cores of the second computing device. The method further comprises processing, by a virtual router executing on the first processing core based on the assigning, network traffic for the workload.

The details of one or more examples of this disclosure are set forth in the accompanying drawings and the description below. Other features, objects, and advantages will be appar- ent from the description and drawings, and from the claims.

BRIEF DESCRIPTION OF DRAWINGS

FIG. 4 is a flowchart illustrating an example operation of a method in accordance with techniques described herein.

Like reference characters denote like elements throughout the description and figures.

DETAILED DESCRIPTION

Figure 1:
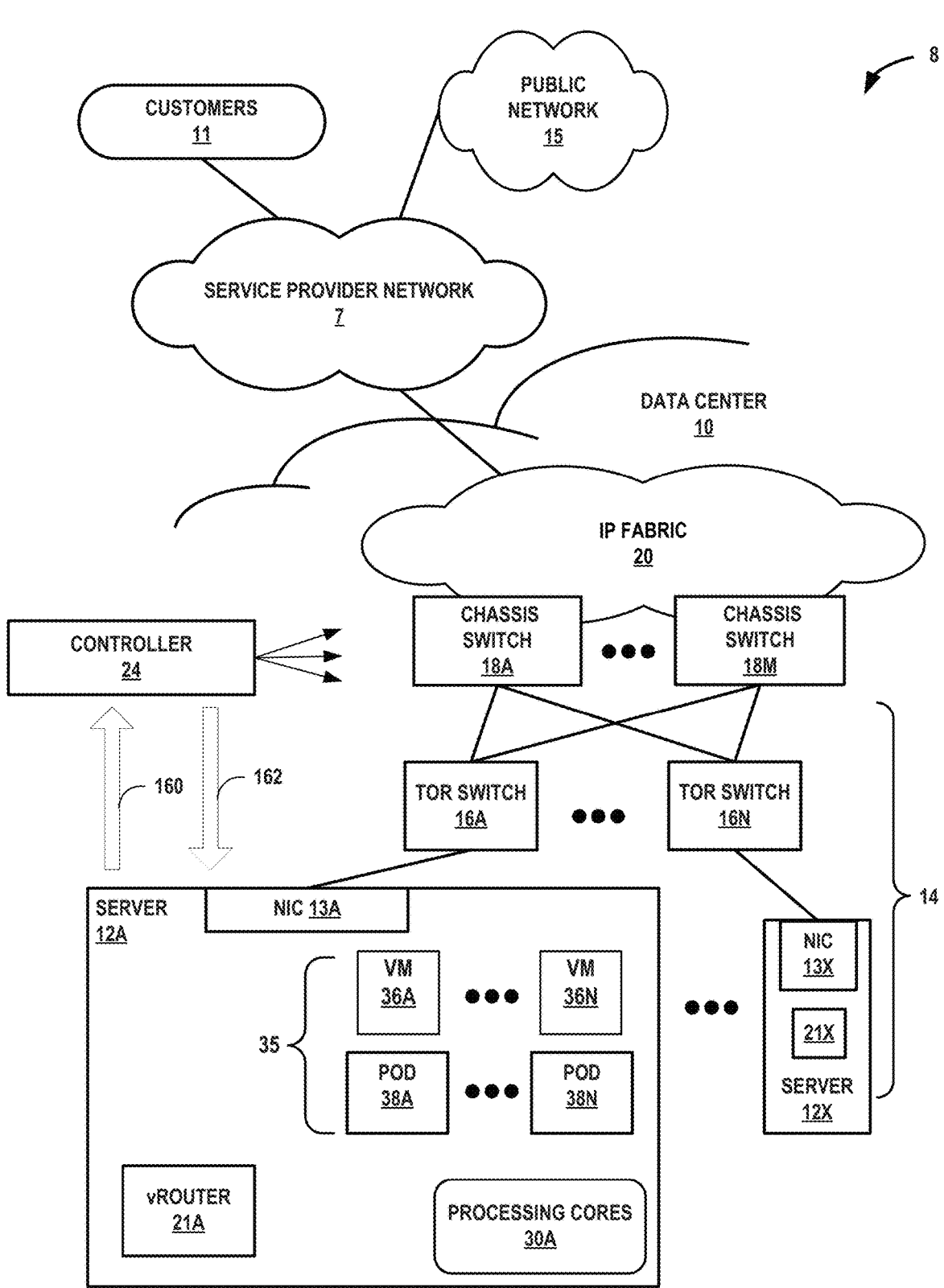
FIG. 1 is a block diagram illustrating an example com- puting infrastructure in which examples of the techniques described herein may be implemented.

FIG. 1 is a block diagram illustrating an example com- puting infrastructure 8 in which examples of the techniques described herein may be implemented. In general, data center 10 provides an operating environment for applica- tions and services for customer sites 11 (illustrated as "customers 11") having one or more customer networks coupled to the data center by service provider network 7. Data center 10 may, for example, host infrastructure equip- ment, such as networking and storage systems, redundant power supplies, and environmental controls. Service pro- vider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers (or "nodes") interconnected via a switch fabric 14 provided by one or more tiers of physical network switches and routers, with servers 12A-12X (herein, "servers 12") depicted as coupled to top-of-rack (TOR) switches 16A-16N. Servers 12 are computing devices and may also be referred to herein as "hosts" or "host devices" in that servers 12 host workloads 35 for execution by servers 12. Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provider servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Servers 12 may include one or more processing cores. Server 12A includes processing cores 30A, server 12X includes processing cores 30X (not shown), and so forth. Each core of processing cores 30A is an independent execution unit ("core") to perform instructions that conform to an instruction set architecture, the instructions stored to storage media. Execution units may be implemented as separate integrated circuits (ICs) or may be combined within one or more multi-core processors (or "many-core" processors) that may be each implemented using a single IC (i.e., a chip multiprocessor).

Any server of servers 12 may be configured with workloads 35 by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Network (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

Virtual routers running in servers 12 (e.g., vRouters 21) create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other workloads, such as any Media Access Control (MAC) addresses, IP address, or policies. The forwarding tables of the underlay physical routers and switches may, for example, only contain the IP prefixes or MAC addresses of the physical servers 12. Gateway routers or switches that connect a virtual network to a physical network are an exception and may contain tenant MAC or IP addresses.

Virtual routers 21 of servers 12 often contain per-tenant state. For example, they may contain a separate forwarding table (a routing-instance) per virtual network. The forwarding table contains the IP prefixes (in the case of layer 3 overlays) or the MAC addresses (in the case of layer 2 overlays) of the virtual machines or other workloads (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one workload present on the server 12).

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more workloads 35 each having at least one virtual network endpoint for one or more virtual networks configured in the physical network. A virtual network endpoint for a virtual network may represent one or more workloads that share a virtual network interface for the virtual network. For example, a virtual network endpoint may be a virtual machine, a set of one or more containers (e.g., a pod), or another other workload(s), such as a layer 3 endpoint for a virtual network. The term "workload" encompasses virtual machines, containers, and other virtualized computing resources, as well as native processes that provide an at least partially independent execution environment for applications. The term "workload" may also encompass a pod of one or more containers. As shown in FIG. 1, server 12A hosts one or more virtual network endpoints that are workloads 35, in the form of pods 38A-38N (collectively, "pods 38") and VMs 36A-36N (collectively, "VMs 36"). Pods 38 may be Kubernetes Pods or another container deployment structure. Server 12 may host only Pods, only VMs, different numbers of Pods and VMs, and/or may host other types of workloads.

Server 12A may execute as many workloads 35 as is practical given hardware resource limitations of server 12A. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switches 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O may be a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among container may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Servers 12 each include one or more processing cores. Workloads 35 of server 12A are executed by processing cores 30A according to an assignment, often referred to as "pinning" in that the underlying process for a given workload 35 is "pinned" to a particular core of processing cores 30A, which executes the software instructions for the workload. For example, VM 36A may be pinned to a first core of processing cores 30A, which executes VM 36A and any applications therein. Pod 38N may be pinned to a second core of processing cores 30A, which executes Pod 38N and any containerized applications therein. In this disclosure, the processing core assigned to execute a workload can be different than the processing core assigned to process network traffic for the workload.

One or more of servers 12 may each include an individual virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of server 12A, but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., VM 36A or pod 38A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Each of servers 12 provides an operating environment for execution of one or more application workloads 35. As described herein, the terms "application workloads" or "workloads" may be used interchangeably to refer to application workloads. Workloads 35 may be deployed using a virtualized environment, such as virtual machines 36, a pods 38, or other types of virtualized instances, or in some cases on a bare metal server that executes the workloads 35 directly rather than indirectly in a virtualized environment. Some or all of the servers 12 can be bare metal servers (BMS). A BMS can be a physical server that is dedicated to a specific customer or tenant.

Each of workloads 35 is executed by one of processing cores 30A. That is, processing cores 30A executes respective software instructions for the workloads 35, and workloads 35 send and receive traffic using virtual networks managed in part by controller 24 and virtual routers 21.

Processing cores 30A also execute virtual router 21A. Virtual router 21A uses processing cores 30A to service the networking requirements of each workload, such as to process (e.g., by routing, forwarding, or applying services to) network traffic sent by the workload or destined for the workload and therefore associated with the workload. Different workloads 35 may be associated with different amounts of network traffic, which can also change over time for each workload.

Virtual router 21A may load balance among processing cores 30A that virtual router 21A uses to process network traffic associated with different workloads 35. Virtual routers 21 may use one or more of processing cores 30A to service network capabilities of workloads by processing network traffic associated with workloads. Virtual routers conventionally assign the processing cores to process network traffic for different workloads in a round-robin manner, and the assigned processing core continues processing the network traffic for the workload until the workload is deleted. In other words, virtual routers statically assign a core of processing cores 30A to handle network traffic for each workload. Conventional virtual routers may assign the network traffic processing for network traffic associated with a workload to a processing core that is overworked in terms of the existing load the processing core has already been tasked with. Additionally, some processing cores may be "starved" by having a minimal load and would be better equipped to handle the network capabilities for the workload.

The techniques described herein provide for intelligent and dynamic balancing of one or more processing cores processing network traffic for workloads. Based on metrics indicative of network traffic processing associated with each of workloads 35, virtual router 21A selectively assigns different processing cores 30A to process network traffic for each of workloads 35.

In some examples, controller 24 may receive one or more metrics 160 associated with workloads 35 and one or more metrics associated with current utilization or load of each processing core of processing cores 30A. The one or more metrics 160 may include, for each of workloads 35: a number of packets or bytes sent and received in a time interval (e.g., every minute), an amount of memory used by virtual routers 21 to processes network traffic for the workload in the time interval, a cumulative number of packets or bytes sent and received, an amount of time the workload has been operating, etc. One or more of metrics 160 may alternatively or additionally be based on a quantization of virtual routers 21 utilization of processing cores 30A to process network traffic for each workload. Metrics 160 may also include the current load of each processing core of processing cores 30A based on a percentage of resources of each processing core in use within a time interval (e.g., every minute). Controller 24 may receive the one or more metrics from virtual router 21A via an application programming interface, such as Prometheus, a telemetry interface, or via another interface.

Controller 24 may analyze the one or more metrics to determine assignments of workloads 35 to processing cores 30A. In some instances, controller 24 may analyze the one or more metrics by evaluating the current load or utilization of each processing core and determining the expected network traffic processing requirements of workloads 35. Controller 24 may also determine the expected network traffic processing requirements of new workloads to be deployed to server 12A. Controller 24 may quantify the current load of each processing core based on a percentage of the processing core utilized by virtual router 21A to process network traffic for each workload. For example, virtual router 21A may use 5% of a first processing core to process the network traffic of a first workload and may use 7% of the first processing core to process the network traffic of a second workload. Controller 24 may also determine that a second processing core is not being effectively utilized, i.e., is "starved." In this example, controller 24 may determine that virtual router 21A should process the network traffic for the second workload using the second processing core to effectively rebalance the load among the processing core 30A.

In other instances, controller 24 may analyze the one or more metrics 160 associated with the current load of each processing core of processing cores 30A by evaluating the current load of each processing core with respect to one or more threshold values. Controller 24 may use a threshold value representing a maximum allowed load of a processing core used by virtual router 21A to process network traffic for workloads. Controller 24 may alternatively use threshold values to classify current loads of each processing core. Controller 24 may assign a threshold value for classifications based on the percentage of the processing core currently in use. For example, controller 24 may use two different threshold values to classify each processing core as either having a "low load," "medium load," or "high load." Controller 24 may classify a processing core as having a "low load" if the current load of the processing core is below a low load threshold (e.g., 3% of the processing core is currently in use). Controller 24 may classify a processing core as having a "high load" if the current load of the processing core is above a high load threshold (e.g., 25% of the CPU core is currently in use). Controller 24 may classify a processing core as having a "medium load" if the current load of the processing core is between the low load and high load thresholds. Additional thresholds at finer levels of granularity may be used.

In addition or alternatively, controller 24 may analyze one or more metrics 160 associated with the network traffic processing requirements of workloads by evaluating the networking requirements for each workload with respect to threshold values. For example, controller 24 may use two different threshold values to classify each workload as either a "low workload," "medium workload," or "high workload." Controller 24 may classify a workload as being a "low workload" if the networking requirements of the workload is below a low workload threshold. Controller 24 may classify a workload as being a "high workload" if the networking requirements of the workload exceeds a high workload threshold. Controller 24 may classify a workload as being a "medium workload" if the networking requirements of the workload is between the low workload threshold and the high workload threshold.

Once controller 24 has classified each of processing cores 30A based on the corresponding one or more thresholds and classified each of workloads 35 based on the corresponding one or more thresholds, controller 24 may determine which of processing cores 30A should be reassigned a workload (e.g., reassign network traffic processing for a "high workload" currently assigned to a processing core having a "high load" to a processing core having a "low load"). Additional thresholds at finer levels of granularity may be used.

In some instances, controller 24 may receive an indication of a newly deployed workload of workloads 35. Based on metrics 160, controller 24 may assign the network traffic processing for the newly deployed workload to one of processing cores 30A, for instance, a core that is relatively underutilized compared to other the other processing cores. Controller 24 may perform the assignment using the thresholding scheme described above.

For rebalancing, in response to controller 24 determining the network traffic processing for any of workloads 35 should be processed by a different processing core, controller 24 may instruct virtual router 21A to process the network traffic for a workload with a different processing core. In some examples, controller 24 may instruct virtual router 21A to redistribute network traffic processing for workloads 35 across processing cores 30A such that the load of each processing core is relatively equal. In some examples, controller 24 may instruct virtual router 21A to distributed network traffic processing for workloads 35 across processing cores 30A based on processing core capacity, load, utilization, or other metrics that indicate an ability of a processing core to handle additional network traffic processing load. In some examples, controller 24 may instruct virtual router 21A to redistribute network traffic processing for workloads 35 across the cores of processing cores 30A such that controller 24 does not classify any cores as having a "high load" and such that a minimal number of cores are classified as having a "low load."

To instruct virtual router 21A with the determined assignments of network processing for workloads 35 to individual processing cores 30A, controller 24 may send assignment data 162 to virtual router 21A. Assignment data 162 may include a mapping of a workload to a particular one of processing cores 30A to indicate virtual router 21A is to assign network traffic processing for the workload to the processing core. The workload may be identified in assignment data 162 using a workload identifier, name, or other identifier. A processing core may be identified in assignment data 162 using a processor ID, core ID, a combination thereof, or other identifier uniquely identifying a processing core of processing cores 30A. Assignment data 162 may include mappings for multiple workloads.

Controller 24 may receive the one or more metrics 160, analyze the one or more metrics 160, determine whether network traffic processing for a workload should be assigned to a different processing core, and instruct virtual router 21A to assign or reassign the network traffic processing for the workload in periodic intervals (e.g., every ten minutes).

Virtual router 21A may assign or reassign workloads 35 according to assignment data 162 from controller 24. Virtual router 21A then services (i.e., processes network traffic for) each of workloads 35 with the corresponding assigned one of processing cores 30A.

To process network traffic from a particular workload of workloads 35 with the assigned one of processing cores 30A, virtual router 21A may use parameters such as a name and identifier for a virtual router interface, one or more software queues associated with the network traffic of the workload, one or more hardware queues assigned to one or more corresponding forwarding cores of virtual router 21A associated with the assigned processing core, and an identifier for each of the plurality of processing cores. For example, network traffic for a workload (e.g., pod 38A or VM 36A) may be queued with a software queue, based on an assignment as described above, to a hardware queue that is mapped to a particular processing core. A thread of virtual router 21A (e.g., a forwarding core allocated by virtual router 21A to handle a corresponding hardware queue), executing on the processing core, services software queues of the workload to process the network traffic of the workload. Other threads of virtual router 21A may operate similarly for other processing cores to service respective hardware queues for those processing cores.

The techniques described above with respect to server 12 and virtual router 21A may be applied in a similar manner in other servers 12 and by other virtual routers 21, for workloads executing on the servers based on assignments to processing cores of those servers. By assigning network traffic processing for workloads 35 in a manner informed by metrics 160, virtual router 21A can more efficiently and effectively load balance workloads' network processing among processing cores 30A versus a static, round-robin assignment scheme. Dynamic re-balancing of the assignments may reduce processing core starvation (network processing load too low) or overloading (network processing load too high), improve overall utilization, and/or reduce network processing bottlenecks that may occur due oversubscribing a processing core.

Figure 2:
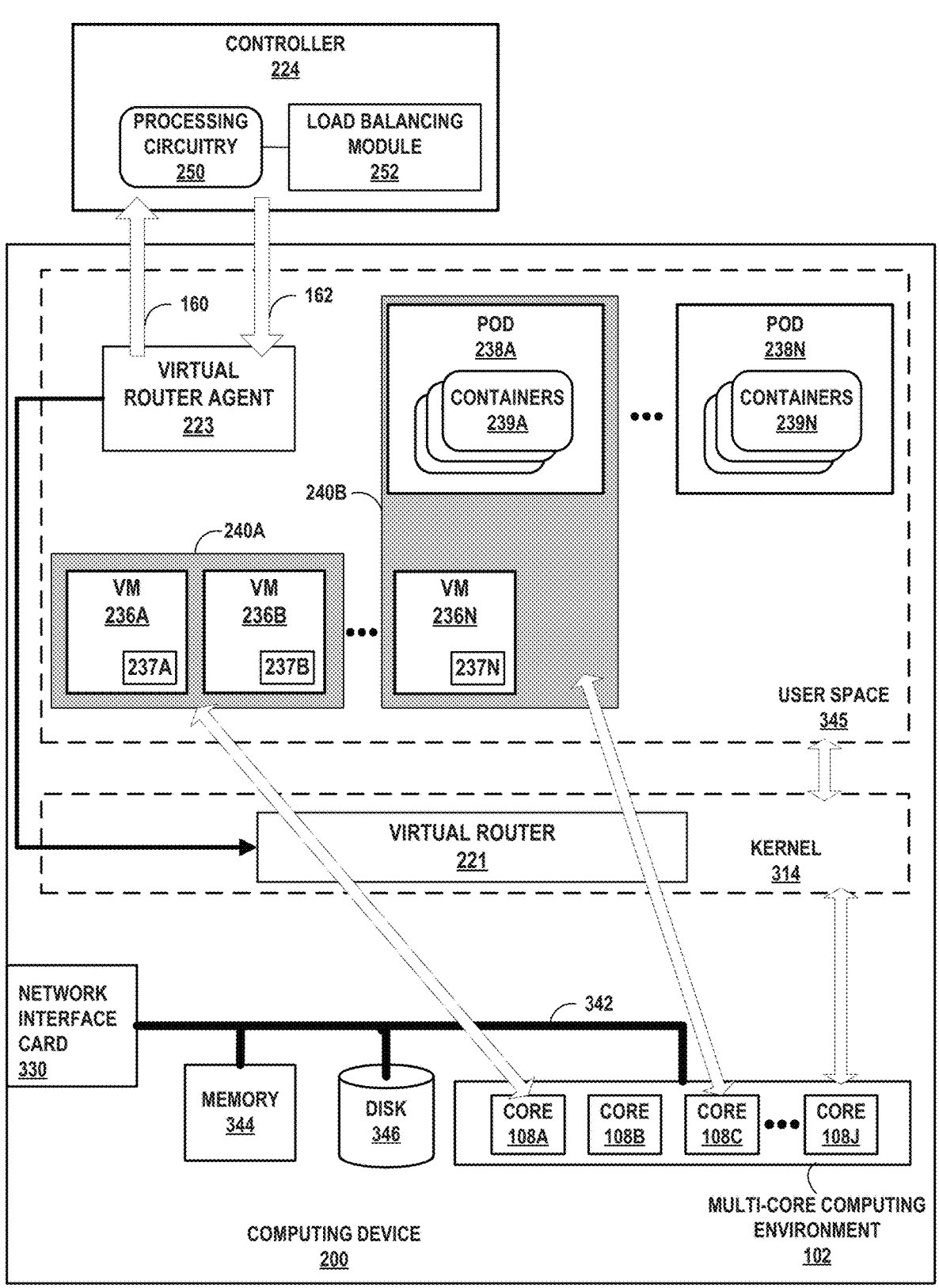
FIG. 2 is a block diagram illustrating an example com- puting device in which examples of the techniques described herein may be implemented.

FIG. 2 is a block diagram illustrating an example computing device in which examples of the techniques described herein may be implemented. Computing device 200 may represent any servers 12 of FIG. 1 or another device, such as any of TOR switches 16.

Computing device 200 includes, in this example, a system bus 342 coupling hardware components of a computing device 200 hardware environment. System bus 342 couples memory 344, network interface card 330, storage disk 346, and multi-core computing environment 102 having a plurality of processing cores 108A-108J (collectively, "cores 108"). Network interface card 330 includes interfaces configured to exchange packets using links of an underlying physical network. Multi-core computing environment 102 may include any number of processors and any number of hardware cores from, for example, four to thousands. Each of cores 108 include an independent execution unit to perform instructions that conform to an instruction set architecture for the core. Cores 108 may each be implemented as separate integrated circuits (ICs) or may be combined within one or more multi-core processors (or "many-core" processors) that are each implemented using a single IC (i.e., a chip multiprocessor), package, or die.

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Memory 344 may in some examples present a non-uniform memory access (NUMA) architecture to multi-core computing environment 102. That is, cores 108 may not have equal memory access time to the various storage media that constitute memory 344. Cores 108 may be configured in some instances to use the portions of memory 344 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 344, at least some of the remaining portions of memory 344 may be directly accessible to cores 108A, 108B. One or more of cores 108 may also include an L1/L2/L3 cache or a combination thereof. The respective caches for cores 108 offer the lowest-latency memory access of any of storage media for the cores 108. When rebalancing, controller 224 may apply load balancing module 252 to rebalance network traffic processing for a particular workload to a different core that has similar memory access times as the previous core for the workload, e.g., from core 108A to 108B in the above example. Load balancing module 252 incorporating this rebalancing factor, i.e., similar memory access times, can improve performance.

Memory 344, network interface card 330, storage disk 346, and multi-core computing environment 102 provide an operating environment for a software stack that executes virtual router 221 and one or more virtual machines 236A-236N (collectively, "virtual machines 236"). Virtual machines 236 may represent example instances of any of virtual machines 36 of FIG. 1. The computing device 200 partitions the virtual and/or physical address space provided by main memory 344 and in the case of virtual memory by disk 346 into user space 345, allocated for running user processes, and kernel space 314, which is protected and generally inaccessible by user processes. An operating system kernel (not shown) may execute in kernel space and may include, for example, a Linux, Berkeley Software Distribution (BSD), another Unix-variant kernel, or a Windows server operating system kernel, available from Microsoft Corp. Computing device 200 may in some instances execute a hypervisor to manage virtual machines 236 (also not shown). Example hypervisors include Kernel-based Virtual Machine (KVM) for the Linux kernel, Xen, ESXi available from VMware, Windows Hyper-V available from Microsoft, and other open-source and proprietary hypervisors. In addition, virtual machines 236 may execute applications 237.

Pod 238A-Pod 238N (collectively "pods 238") may include containers 239A-containers 239N (collectively "containers 239"). Containers 239 may include the virtualization of an operating system to run multiple isolated systems on a single machine (virtual or physical). Examples of containers 239 include containers provided by the open-source DOCKER container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, container may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

The virtual router in this example of computing device 200 includes a kernel space 314 module: virtual router 221, as well as a user space 345 module: virtual router agent 223. Virtual router 221 executes the "forwarding plane" or packet forwarding functionality of the virtual router and virtual router agent 223 executes the "control plane" functionality of the virtual router. Some instances of virtual router forwarding plane 221 may execute in user space (e.g., as a DPDK virtual router) or on a SmartNIC. Additional description of a virtual router agent and virtual router forwarding plane to implement a virtual router is found in U.S. Pat. No. 9,571,394, issued Feb. 14, 2017, which is incorporated by reference herein in its entirety.

When virtual router agent 223 for the virtual router receives an indication of a new workload deployed to computing device 200, virtual router agent 223 may initially assign a core of cores 108 to process the network traffic for the new workload (e.g., pods 238 or virtual machines 236).

In this example, controller 224 may include processing circuitry 250 and load balancing module 252. Load balancing module 252 may execute on processing circuitry 250 to analyze metrics 160 and generate assignment data 162 indicating what processing cores of cores 108 virtual router 221 should use to process networking traffic for workloads (e.g., VMs 236 or pods 238).

In accordance with the techniques described herein, controller 224 may receive one or more metrics 160 associated with cores 108 and with network traffic processing for workloads executing in user space 345. Metrics 160 may, for example, include data indicating a current load of cores 108A-108J and data indicating network traffic processing requirements for workloads 240A and 240B. Controller 224 may obtain metrics 160 and analyze the data with load balancing module 252. Load balancing module 252 may analyze metrics 160 by classifying each core of cores 108 and the network traffic processing requirements of each workload. Load balancing module 252 may also use the classifications of cores 108, classifications of workloads (e.g., workloads 240A and 240B) or other means to generate assignment data 162. For example, load balancing module 252 may generate assignment data 162 indicating that workloads 240A (i.e., VMs 236A and 236B) should be assigned to core 108A and workloads 240B (i.e., VM 236N and pod 238A) should be assigned to core 108C. Load balancing module 252 may send assignment data 162 to virtual router agent 223. Virtual router agent may apply assignment data 162 to assign or reassign which core of cores 108 virtual router 221 uses to process network traffic for workloads 240A and 240B. In this example, virtual router 221 may use core 108A when processing networking traffic for workload 240A and core 108C when processing network traffic for workload 240B, according to assignment data 162.

Load balancing module 252 may also allocate one or more cores of cores 108 to specifically handle network traffic processing. For example, load balancing module 252 may designate cores 108A and 108C to handle all network traffic processing for workloads executing in user space 345. Load balancing module 252 may use metrics 160 to determine the current loads of core 108A (e.g., 2%) and core 108C (e.g., 5%) and assign workload 240A to core 108A and workload 240B to core 108B as long as the current loads of cores 108A and 108C do not exceed a certain threshold (e.g., 20%). If metrics 160 indicate that cores 108A and 108C exceed the threshold, load balancing module 252 may designate another core (e.g., core 108B) for virtual router 221 to use to process networking traffic for workloads to execute on user space 345.

In some instances, controller 224 may generate a profile for a type of workload. Controller 224 may generate the profile based on the one or more metrics associated with processing network traffic for the type of workload. In some examples, controller 224 may apply a machine learning model, trained with metrics 160, to generate the profile based on patterns of network traffic associated with the type of workload. Relevant patterns of network traffic discernible from metrics 160 may include, e.g., amount of traffic or periodicity of traffic (e.g., traffic highest during evenings or on weekends), which may be used to predict CPU utilization patterns by the traffic also included in metrics 160. For example, controller 224 may learn a typical CPU core usage by various instances of virtual router 221 in use within a system to process network traffic for the type of workload based on the one or more metrics 160. Controller 224 may generate a profile of the type of workload based on its typical CPU core usage. Virtual router 221 may receive the profile for the type of workload from controller 224.

Virtual router 221 may receive an indication of a new workload deployed to computing device 242, where the new workload is a type of workload having a matching profile. Virtual router 221 may assign the workload to a core of cores 108 based on the profile of the type of workload and the current load classification or utilization of each core.

Figure 3:
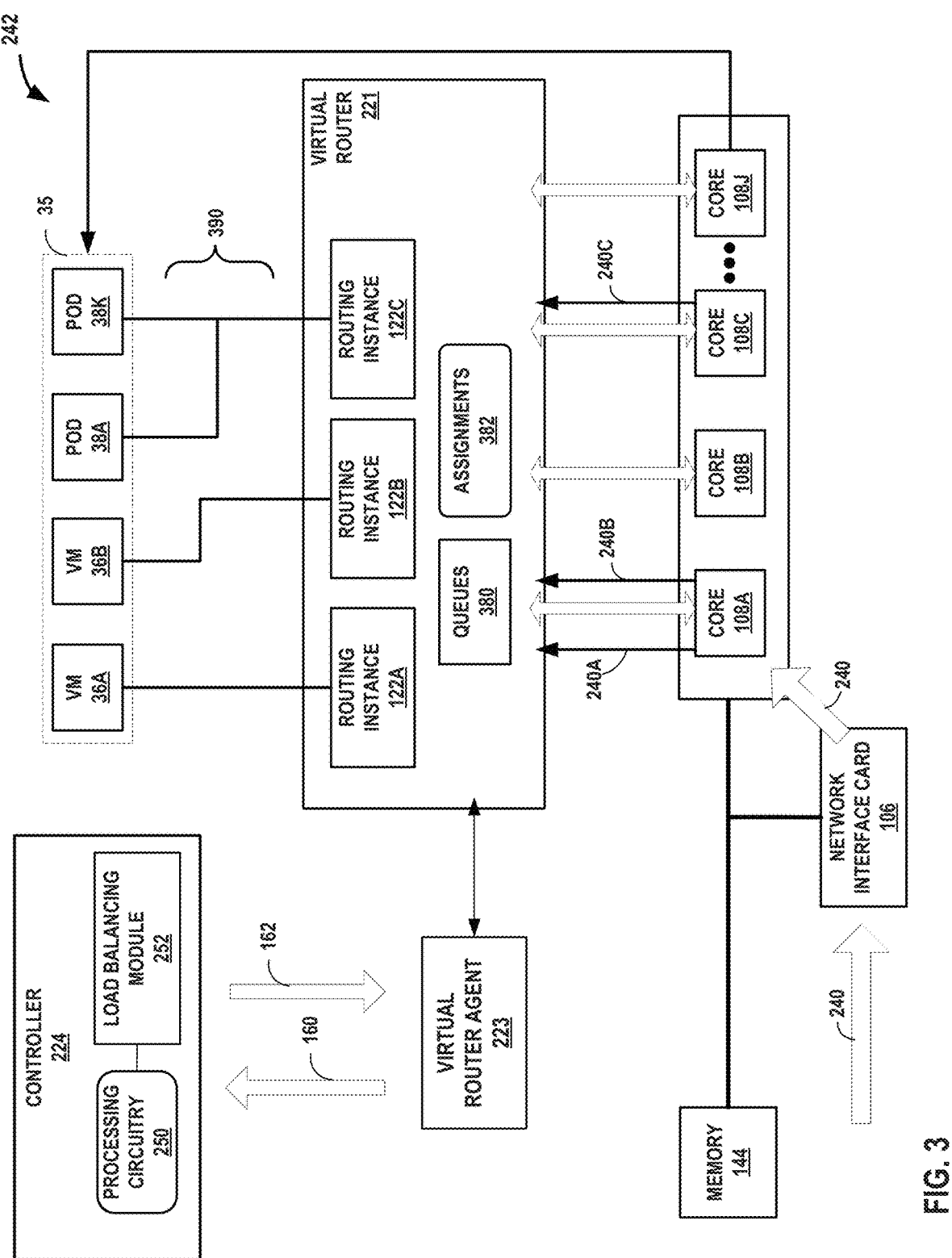
FIG. 3 is a block diagram illustrating example compo- nents of an example computing device that executes a virtual router for virtual networks according to techniques described herein.

FIG. 3 is a block diagram illustrating example components of example computing device 242 that executes a virtual router 221 for virtual networks according to techniques described herein. Computing device 242 may be an example of computing device 200 of FIG. 2, or of any of servers 12, or another computing device described in this disclosure.

Example computing device 242 includes network interface card (NIC) 106 that is configured to direct packets received by NIC 106 to processing core 108A for processing. As illustrated, NIC 106 receives packet flows 240A-240C (collectively, "packet flows 240") and may store packet flows 240 to memory 144 for eventual processing by virtual router 221. Likewise, network traffic output by workloads via virtual network interfaces 390 to virtual router 221 is stored to memory 144 for eventual processing by virtual router 221.

Virtual router 221 includes multiple routing instances 122A-122C (collectively, "routing instances 122") for corresponding virtual machine 236A-236K (collectively, virtual machines 236). Virtual router 221 uses routing instances 122 to process packet flows 240 sourced by or destined to particular workloads 35 according to workload assignments 382 that map each of workloads 35 to an assigned core of cores 108. Virtual router 221 may enqueue network traffic processing for workloads 35 using queues 380. Queues 380 may enqueue network traffic processing based on a mapping of assignments of workloads 35 to cores 108 provided by assignments 382. Virtual router agent 223 may update assignments 382 to update mappings based on assignment data 162. Assignments 382 may be based on assignment data 162 sent by controller 224. Assignment data 162 may be a mapping of which core of cores 108 should process network traffic for each workload of workloads 35. Load balancing module 252 of controller 224 may generate assignment data 162 based on metrics 160 as described previously. Further description of hardware queues, DPDK, and software queues for workload interfaces (virtual interfaces) is included in U.S. Publication No. 2022/0278927, published Sep. 1, 2022, which is incorporated by reference herein in its entirety.

In this example, network interface card 106 receives packet flows 240. Network interface card 106 may store packet flows 240 to memory 144 for eventual processing by virtual router 221 executing one or more of cores 108. In this example, packet flow 240A is destined to VM 36A, packet flow 240B is destined to VM 36B, and packet flow 240C is destined to pod 38A. Virtual router 221 may use assignments 382 to determine which core of cores 108 will process packet flows corresponding to each workload (e.g., VM 36A, VM 36B, and pod 38A). Virtual router 221 may, for example, use queues 380 to enqueue packet flow 240A to be processed with core 108A, enqueue packet flow 240B to be processed with core 108A and enqueue packet flow 240C to be processed with core 108C. A similar process may be applied for packet flows sourced by each of the workloads.

In some instances, load balancing module 252, based on metrics 160, may determine that packet flow 240B should be processed using core 108B instead of core 108A due to core 108A exceeding a maximum load threshold, for example. In response to determining that packet flow 240B should be processed using core 108B, load balancing module 252 may send assignment data 162 to virtual router agent 223. Virtual router agent 223 may reconfigure assignments 382 to map network processing of VM 36B (associated with packet flow 240B) to core 108B. Virtual router 221 will apply the reconfigured assignments 382 to enqueue packet flow 240B to queue 380 to be processed by virtual router 221 executing on core 108B.

FIG. 4 is a flowchart illustrating example operation 400 of a method in accordance with techniques described herein. A computing device may assign, based on one or more metrics that indicate processing cores utilization or that indicate network traffic processing requirements for a workload that is to execute on a second computing device, network traffic processing for the workload to a first processing core of a plurality of processing cores of the second computing device (402). A virtual router may execute on the first processing core based on the assigning to process network traffic for the workload (404). In this way, the techniques may improve the functionality of processing cores used to process network traffic for workloads.

Figure 5:
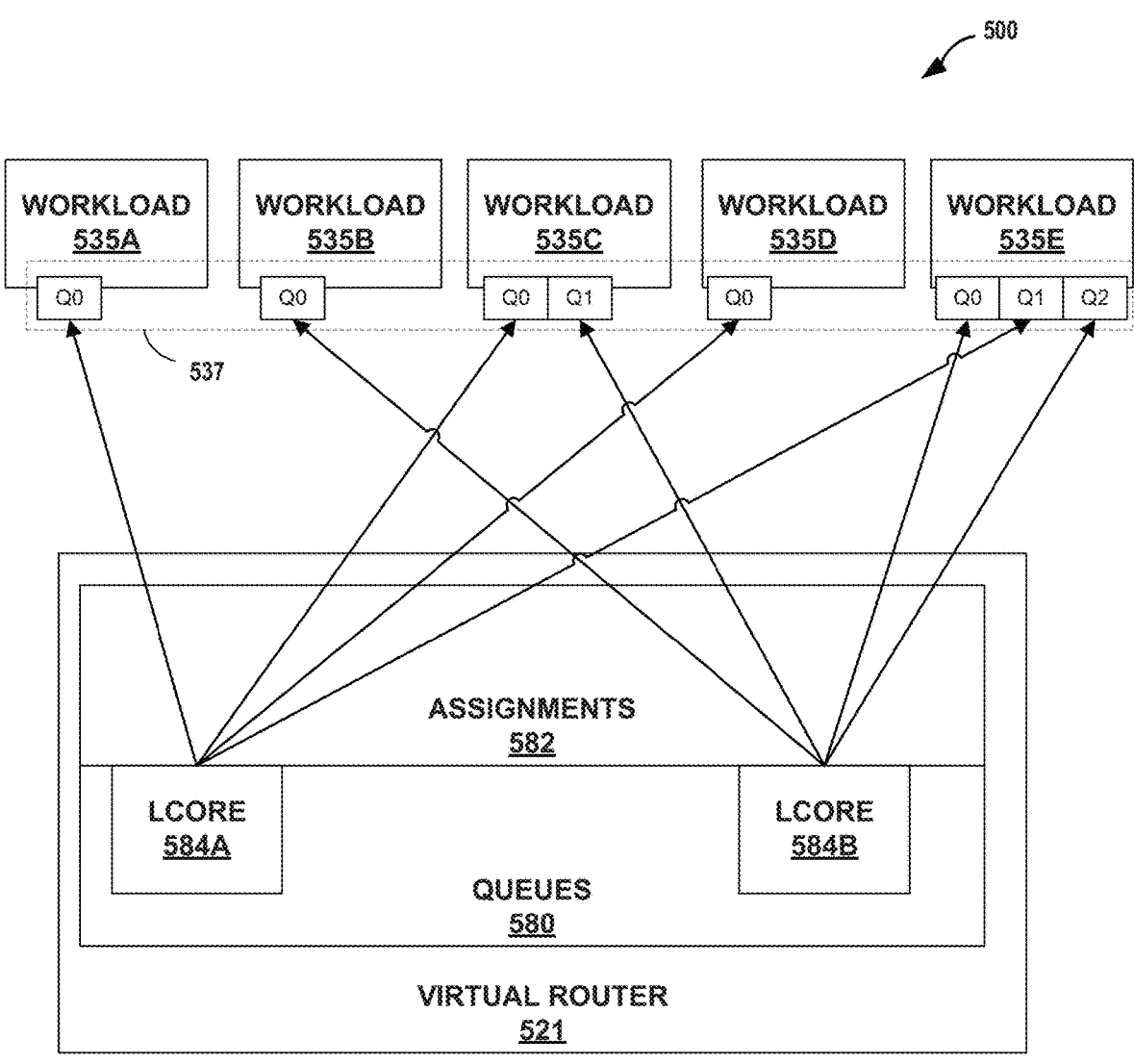
FIG. 5 is a block diagram illustrating example compo- nents of an example computing device that executes work- loads and a virtual router for virtual networks according to techniques described herein.

FIG. 5 is a block diagram illustrating example components of an example computing device 500 that executes workloads and a virtual router for virtual networks according to techniques described herein. Virtual router 521 may represent an example instance of virtual router 221 in FIG. 3. Virtual router 521 may include queues 580 and assignments 582 which may represent an example instance of queues 380 and assignments 382 of FIG. 3 respectively. Queues 580 may include one or more forwarding cores (e.g., lcore 584A and lcore 584B), wherein each forwarding core is associated with a hardware core a NIC (e.g., NIC 106 of FIG. 3) uses when processing traffic on a corresponding processing core (e.g., cores 108 of FIG. 3).

Virtual router 521 may have forwarding cores lcore 584A and lcore 584B associated with hardware queues assigned by a NIC connected to virtual router and configured with a virtual router interface. When a workload (e.g., workloads 535A-E) is created, a virtual interface of the workload may have one or more software queues (e.g., software queues 537), where each software queue is assigned to a forwarding core of virtual router 521 via assignments 582. Typically, assignments 582 assigns allocated forwarding cores of queues 580 to software queues of workloads (e.g., software queues 537) in a round-robin manner. For example, software queue Q0 of workload 535A may be assigned to lcore 584A, software queue Q0 of workload 535B may be assigned to lcore 584B, software queue Q0 of workload 535C may be assigned to lcore 584A, software queue Q1 of workload 535C may be assigned to lcore 584B, and so forth.

In another example, a virtual router may have allocated four forwarding cores corresponding to four hardware queues to service network traffic of a plurality workloads each associated with one or more software queues. The following example assignment of software queues to forwarding cores of a virtual router, which is distinct from the example provided in FIG. 5, demonstrates how software queues are typically assigned to forwarding cores in a round-robin manner. First, a virtual router obtains a physical function from a NIC and allocates the same number of hardware queues in the NIC (identified by HW Queue ID) as the number of forwarding cores (identified by Lcore) of the virtual router (identified by Virtual Router Interface). In this example, NIC has four hardware queues which results in the virtual router allocating four forwarding cores, one for each hardware queue.

Lcore 584C:
  Virtual Router Interface: 0000:17:01.1 HW Queue ID: 0
Lcore 584D:
  Virtual Router Interface: 0000:17:01.1 HW Queue ID: 1
Lcore 584E:
  Virtual Router Interface: 0000:17:01.1 HW Queue ID: 2
Lcore 584F:
  Virtual Router Interface: 0000:17:01.1 HW Queue ID: 3

Second, when workloads are created or instantiated, one or more software queues (identified by SW Queue ID) of each workload (identified by Workload Interface) are assigned to each forwarding core of the virtual router in a round-robin manner.

```
Lcore 584C:
Virtual Router Interface: 0000:17:01.1      HW Queue ID: 0
Workload Interface: vhostnet1-XXX-a1       SW Queue ID: 0
Workload Interface: vhostnet1-XXX-b1       SW Queue ID: 0
Workload Interface: vhostnet1-XXX-c1       SW Queue ID: 0
Workload Interface: vhostnet1-XXX-d1       SW Queue ID: 0
Lcore 584D:
Virtual Router Interface: 0000:17:01.1      HW Queue ID: 1
Workload Interface: vhostnet1-XXX-a2       SW Queue ID: 0
Workload Interface: vhostnet1-XXX-b1       SW Queue ID: 1
Workload Interface: vhostnet1-XXX-c2       SW Queue ID: 0
Workload Interface: vhostnet1-XXX-d2       SW Queue ID: 0
Lcore 584E:
Virtual Router Interface: 0000:17:01.1      HW Queue ID: 2
Workload Interface: vhostnet1-XXX-a3       SW Queue ID: 0
Workload Interface: vhostnet1-XXX-b1       SW Queue ID: 2
Workload Interface: vhostnet1-XXX-c2       SW Queue ID: 1
Lcore 584F:
Virtual Router Interface: 0000:17:01.1      HW Queue ID: 3
Workload Interface: vhostnet1-XXX-a3       SW Queue ID: 1
Workload Interface: vhostnet1-XXX-b2       SW Queue ID: 0
Workload Interface: vhostnet1-XXX-c2       SW Queue ID: 2
```

However, forwarding cores of virtual router 21A may become unbalanced when workloads are created and/or deleted because virtual router 21A does not proactively reassign software cores of the workload to forwarding cores. For example, workloads with workloads interfaces of vhostnet1-XXX-a3, vhostnet1-XXX-b2, and vhostnet1-XXX-c2 may be deleted and a workload with a workload interface of vhostnet1-XXX-e1 may be created with only one software queue, which results in the following:

```
Lcore 584C:
Virtual Router Interface: 0000:17:01.1      HW Queue ID: 0
Workload Interface: vhostnet1-XXX-a1       SW Queue ID: 0
Workload Interface: vhostnet1-XXX-b1       SW Queue ID: 0
Workload Interface: vhostnet1-XXX-c1       SW Queue ID: 0
Workload Interface: vhostnet1-XXX-d1       SW Queue ID: 0
Lcore 584D:
Virtual Router Interface: 0000:17:01.1      HW Queue ID: 1
Workload Interface: vhostnet1-XXX-a2       SW Queue ID: 0
Workload Interface: vhostnet1-XXX-b1       SW Queue ID: 1
Workload Interface: vhostnet1-XXX-c2       SW Queue ID: 0
Workload Interface: vhostnet1-XXX-d2       SW Queue ID: 0
Lcore 584E:
Virtual Router Interface: 0000:17:01.1      HW Queue ID: 2
Workload Interface: vhostnet1-XXX-b1       SW Queue ID: 2
Workload Interface: vhostnet1-XXX-c2       SW Queue ID: 1
Workload Interface: vhostnet1-XXX-e1       SW Queue ID: 0
Lcore 584F:
Virtual Router Interface: 0000:17:01.1      HW Queue ID: 3
```

This example demonstrates how the dynamic nature of deleting and creating workloads results in an uneven distribution of software queues to forwarding cores. Here, Lcore 584F is not assigned any software queues while Lcore 584C and Lcore 584D are assigned four software queues. If the assignment of software queues to forwarding queues continues in a round-robin manner, the inequality of software queues assigned to forwarding cores may never be resolved.

In accordance with techniques of this disclosure, assignments of queues to a forwarding core may need to be readjusted as workloads may be created or deleted dynamically. In some instances, an external controller (e.g., controller 224 of FIG. 3) may obtain metrics (e.g., metrics 160 of FIG. 3) of current software queue assignments to forwarding cores of the virtual router (an example of processing core utilization because a forwarding core corresponds to a particular processing core) periodically, or in response to one or more workloads being created or deleted. In this example, the metrics may include the assignments of software queues to forwarding cores of the virtual router, as well as a reference to what forwarding core will be assigned a newly created software core. In the above example, the metrics may include a reference to the assignment of the next software queue to Lcore 584F because the last software queue (i.e., SW Queue ID: 0 for Workload Interface: vhostnet1-XXX-e1) was assigned to Lcore 584E. The external controller may determine that the assignment of software queues to forwarding cores may need to be reassigned to ensure that subsequent round-robin assignments of software queues to forwarding cores results in the same number of software queues assigned to each forwarding core for each given cycle of the round-robin assignment (i.e., before a new software queue is assigned to the first allocated forwarding core or after a new software queue is assigned to the last allocated forwarding core). In this instance, the external controller may send assignment data (e.g., assignment data 162 of FIG. 3) to a virtual router agent (e.g., virtual router agent 223) to instruct the virtual router to reassign the software queues to forwarding cores as follows:

```
Lcore 584C:
Virtual Router Interface: 0000:17:01.1      HW Queue ID: 0
Workload Interface: vhostnet1-XXX-a1       SW Queue ID: 0
Workload Interface: vhostnet1-XXX-b1       SW Queue ID: 0
Workload Interface: vhostnet1-XXX-c1       SW Queue ID: 0
Lcore 584D:
Virtual Router Interface: 0000:17:01.1      HW Queue ID: 1
Workload Interface: vhostnet1-XXX-a2       SW Queue ID: 0
Workload Interface: vhostnet1-XXX-b1       SW Queue ID: 1
Workload Interface: vhostnet1-XXX-c2       SW Queue ID: 0
Lcore 584E:
Virtual Router Interface: 0000:17:01.1      HW Queue ID: 2
Workload Interface: vhostnet1-XXX-b1       SW Queue ID: 2
Workload Interface: vhostnet1-XXX-c2       SW Queue ID: 1
Workload Interface: vhostnet1-XXX-e1       SW Queue ID: 0
Lcore 584F:
Virtual Router Interface: 0000:17:01.1      HW Queue ID: 3
Workload Interface: vhostnet1-XXX-d1       SW Queue ID: 0
Workload Interface: vhostnet1-XXX-d2       SW Queue ID: 0
```

In other instances, the external controller may send assignment data to instruct the virtual router to reassign software queues to forwarding queues based on periodically obtained metrics (e.g., metrics 160 in FIG. 3) indicating the amount of traffic particular workloads generate. For example, the metrics may include that the workload with the workload interface of vhostnet1-XXX-b1 may be generating more traffic than the other workloads and requires a significant amount of processing power. In this example, the external controller may obtain metrics indicating that workload with workload interface vhostnet1-XXX-b1 has a greater processing requirement than other workloads. In response to the external controller obtaining metrics indicating that workload with workload interface vhostnet1-XXX-b1 has a greater processing requirement than other workloads, the external controller may send assignment data to a virtual router agent to instruct a virtual router to reassign software queues of the workload with workload interface vhostnet1-XXX-b1 to Lcore 584F to balance the processing requirements of each workload across each hardware queue.

```
Lcore 584C:
Virtual Router Interface: 0000:17:01.1      HW Queue ID: 0
Workload Interface: vhostnet1-XXX-a1       SW Queue ID: 0
Workload Interface: vhostnet1-XXX-c1       SW Queue ID: 0
Workload Interface: vhostnet1-XXX-d1       SW Queue ID: 0
Lcore 584D:
```

-continued

| | |
|---|---|
| Virtual Router Interface: 0000:17:01.1 | HW Queue ID: 1 |
| Workload Interface: vhostnet1-XXX-a2 | SW Queue ID: 0 |
| Workload Interface: vhostnet1-XXX-c2 | SW Queue ID: 0 |
| Workload Interface: vhostnet1-XXX-d2 | SW Queue ID: 0 |
| Lcore 584E: | |
| Virtual Router Interface: 0000:17:01.1 | HW Queue ID: 2 |
| Workload Interface: vhostnet1-XXX-c2 | SW Queue ID: 1 |
| Workload Interface: vhostnet1-XXX-e1 | SW Queue ID: 0 |
| Lcore 584F: | |
| Virtual Router Interface: 0000:17:01.1 | HW Queue ID: 3 |
| Workload Interface: vhostnet1-XXX-b1 | SW Queue ID: 0 |
| Workload Interface: vhostnet1-XXX-b1 | SW Queue ID: 1 |
| Workload Interface: vhostnet1-XXX-b1 | SW Queue ID: 2 |

In general, any operations of the external controller described above (e.g., controller 224 of FIG. 3) may be done by a virtual router (e.g., virtual router 221 of FIG. 3), a virtual router agent (e.g., virtual router agent 223 of FIG. 3), or any other server components included in the techniques described herein.

The techniques described herein, including any of the preceding sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus with a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
determining, by a first computing device, based on one or more metrics that indicate processing cores utilization associated with a plurality of processing cores of a second computing device or that indicate network traffic processing requirements for a plurality of workloads that are to execute on the second computing device, assignment data that maps a workload of the plurality of workloads to a first processing core of the plurality of processing cores;

assigning, by the first computing device, based on the assignment data, network traffic processing for the workload to the first processing core of the plurality of processing cores of the second computing device;

processing, by a virtual router using the first processing core of the second computing device, based on the assigning of network traffic processing for the workload to the first processing core, network traffic for the workload;

classifying, by the first computing device, each of the plurality of workloads based on a first set of thresholds associated with networking requirements of the plurality of workloads;

classifying, by the first computing device, each of the plurality of processing cores based on a second set of thresholds associated with processing core utilization of the plurality of processing cores; and determining, by the first computing device, whether the virtual router should process network traffic for the workload with a different, second processing core of the plurality of processing cores based on respective classifications of the plurality of workloads and respective classifications of the plurality of processing cores.

2. The method of claim 1, wherein the first computing device comprises one of
a controller for a network of servers comprising the second computing device, or
the second computing device.

3. The method of claim 1, wherein the workload is to execute on a third processing core that is different than the first processing core and the second processing core.

4. The method of claim 1, further comprising:
receiving, by the first computing device and from the virtual router, the one or more metrics.

5. The method of claim 1, further comprising:
in response to the first computing device determining the virtual router should process the network traffic for the workload with the second processing core, updating, by the first computing device, the assignment data to map the workload to the second processing core; and
processing, by the virtual router using the second processing core of the second computing device, based on the updated assignment data, network traffic for the workload.

6. The method of claim 1, further comprising assigning, by the first computing device, the workload to one processing core of the plurality of processing cores based on determinations of assignment data in periodic intervals.

7. The method of claim 1, wherein the one or more metrics comprises one or more of:
a number of packets sent from each of a plurality of workloads in a time interval, the plurality of workloads including the workload;

a number of packets received by each of the plurality of workloads in the time interval;

a number of bytes used by the virtual router to process network traffic for each of the plurality of workloads in the time interval; and a processing core utilization of each of the plurality of processing cores in the time interval.

8. The method of claim 1, wherein:

classifying each of the plurality of workloads is further based on additional one or more metrics, and wherein classifying each of the plurality of processing cores is further based on the additional one or more metrics.

9. The method of claim 1, wherein the first set of thresholds include a low workload threshold and a high workload threshold and wherein classifying each of plurality of workloads further comprises:

assigning, by the first computing device, a low workload classification to workloads with metric values below the low workload threshold;

assigning, by the first computing device, a medium workload classification to workloads with metric values above the low workload threshold and below the high workload threshold; and assigning, by the first computing device, a high workload classification to workloads with metric values above the high workload threshold.

10. The method of claim 1, wherein the second set of thresholds include a low load threshold and a high load threshold and wherein classifying each of the plurality of processing cores further comprises:

assigning, by the first computing device, a low load classification to processing cores with metric values below the low load threshold;

assigning, by the first computing device, a medium load classification to processing cores with metric values above the low load threshold and below the high load threshold; and assigning, by the first computing device, a high load classification to processing cores with metric values above the high load threshold.

11. The method of claim 1, further comprising:

generating, by the first computing device, a profile for a type of workload based on networking requirements of the type of workload; and assigning, by the first computing device, a new workload that is the type of workload to the first processing core based on the profile.

12. The method of claim 11, wherein generating, by the first computing device, the profile for the workload comprises applying a machine learning model, wherein the machine learning model is trained to predict networking requirements of workloads that are the type of workload associated with the profile.

13. The method of claim 1, further comprising:

assigning, by the virtual router, a queue to the first processing core;

enqueueing, based on the assigning of network traffic processing for the workload to the first processing core, the network traffic for the workload to the queue; and obtaining the network traffic for the workload based on the queue, prior to processing the network traffic for the workload.

14. A computing system comprising processing circuitry having access to a storage device, the processing circuitry configured to:

determine, based on one or more metrics that indicate processing cores utilization associated with a plurality of processing cores of a computing device or that indicate network traffic processing requirements for a plurality of workloads that are to execute on the computing device, assignment data that maps a workload of the plurality of workloads to a first processing core of the plurality of processing cores;

assign, based on the assignment data, network traffic processing for the workload to the first processing core of the plurality of processing cores of the computing device;

instruct, based on assigning the network traffic processing for the workload to the first processing core, a virtual router using the first processing core of the computing device to process network traffic for the workload;

classify each of the plurality of workloads based on a first set of thresholds associated with networking requirements of the plurality of workloads;

classify each of the plurality of processing cores based on a second set of thresholds associated with processing core utilization of the plurality of processing cores; and determine whether the virtual router should process network traffic for the workload with a different, second processing core of the plurality of processing cores based on respective classifications of the plurality of workloads and respective classifications of the plurality of processing cores.

15. The computing system of claim 14, wherein the processing circuitry is further configured to:

receive the one or more metrics from the virtual router.

16. The computing system of claim 14, wherein the processing circuitry is further configured to:

in response to determining the virtual router should process the network traffic for the workload with the second processing core, update the assignment data to map the workload to the second processing core; and instruct, based on the updated assignment data, the virtual router of the computing device to process the network traffic for the workload using the second processing core.

17. The computing system of claim 14, wherein the processing circuitry is further configured to assign the workload to one processing core of the plurality of processing cores based on determinations of assignment data in periodic intervals.

18. The computing system of claim 14, wherein the processing circuitry is further configured to:

generate a profile for a type of workload based on networking requirements of the type of workload; and assign a new workload that is the type of workload to the first processing core based on the profile.

19. The computing system of claim 18, wherein the processing circuitry is further configured to:

use a machine learning model to predict networking requirements of a type of workload; and generate a profile for the type of workload based on predictions of the networking requirements of the type workload.

20. A computing device comprising:

a plurality of processing cores having access to a storage device, the plurality of processing cores configured to:

obtain assignment data, wherein the assignment data is based on one or more metrics that indicate processing cores utilization associated with the plurality of processing cores or that indicate network traffic processing requirements for a plurality of workloads that are to execute on the computing device, and wherein the assignment data maps a workload of the plurality of workloads to a first processing core of the plurality of processing cores of the computing device;

process, by a virtual router using the first processing core of the plurality of processing cores, based on the assignment data mapping the workload to the first processing core, network traffic for the workload;

classify each of the plurality of workloads based on a first set of thresholds associated with networking requirements of the plurality of workloads;

classify each of the plurality of processing cores based on a second set of thresholds associated with processing core utilization of the plurality of processing cores; and determine whether the virtual router should process network traffic for the workload with a different, second processing core of the plurality of processing cores based on respective classifications of the plurality of workloads and respective classifications of the plurality of processing cores.

* * * * *